United States Patent
Richards (10) Patent No.: US 7,334,373 B2
(45) Date of Patent: *Feb. 26, 2008

(54) COMPOSITE DECKING SYSTEM

(75) Inventor: Daniel H. Richards, Durham, NC (US)

(73) Assignee: ZellComp, Inc., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/125,655

(22) Filed: May 10, 2005

(65) Prior Publication Data

US 2005/0202225 A1 Sep. 15, 2005

Related U.S. Application Data

(63) Continuation of application No. 10/269,491, filed on Oct. 11, 2002, now Pat. No. 6,912,821.

(51) Int. Cl.
*E04C 1/00* (2006.01)

(52) U.S. Cl. ............... 52/309.1; 52/258; 52/309.9; 52/793.11; 52/611

(58) Field of Classification Search ........... 52/309.1, 52/309.9, 309.11, 602, 793.11, 783.1, 729.1, 52/611, 612, 606, 258, 259; 14/73, 77.1
See application file for complete search history.

(56) References Cited

U.S. PATENT DOCUMENTS

| | | | | |
|---|---|---|---|---|
| 2,010,294 A | * | 8/1935 | Dovell | 52/241 |
| 4,125,979 A | * | 11/1978 | McLaughlin | 52/259 |
| 4,453,359 A | * | 6/1984 | Robinson | 52/389 |
| 5,285,610 A | * | 2/1994 | Schaaf et al. | 52/602 |
| 5,305,568 A | * | 4/1994 | Beckerman | 52/309.4 |
| 5,794,402 A | | 8/1998 | Dumlao et al. | |
| 6,023,806 A | | 2/2000 | Dumlao et al. | |
| 6,044,607 A | | 4/2000 | Dumlao et al. | |
| 6,070,378 A | | 6/2000 | Dumlao et al. | |
| 6,081,955 A | * | 7/2000 | Dumlao et al. | 14/73 |
| 6,092,350 A | | 7/2000 | Dumlao et al. | |
| 6,108,998 A | | 8/2000 | Dumlao | |

(Continued)

OTHER PUBLICATIONS

Conference paper entitled "Design Optimization of an All-FRP Short-Span Bridge"; by Phillip Burnside, Ever Barbero, and Julio Dravalos; 1993 (3 pages).

(Continued)

*Primary Examiner*—Basil Katcheves
(74) *Attorney, Agent, or Firm*—Myers Bigel Sibley & Sajovec, P.A.

(57) ABSTRACT

A composite deck assembly includes a baseplate and a top plate secured to the baseplate. The baseplate is formed from a first composite matrix comprising strands of reinforcing fibers oriented in first direction and a polymer resin. The baseplate includes a plurality of ribs and a plurality of laterally extending open channels disposed between the ribs. The top plate is formed from a second composite matrix of reinforcing fibers in a polymer resin, and is secured, optionally releasably, to the baseplate so as to generally enclose at least a portion of the channels. All the reinforcing fibers in the baseplate may be limited to being either the strands oriented in the first direction or matted reinforcing fibers having a random orientation. At least one of the base section and the top plate may be translucent. The open channel configuration simplifies manufacture and lowers cost.

22 Claims, 4 Drawing Sheets

U.S. PATENT DOCUMENTS 6,871,600 B2* 3/2005 Norton et al. ............... 105/404
6,912,821 B2* 7/2005 Richards .................... 52/309.1

OTHER PUBLICATIONS

Conference paper entitled "Composite Applications in Highway Bridges"; by Joseph Plecnik, Waleed Azar, and Bassem Kabbara; 1990 (5 pages).

Conference paper entitled "Optimum Design of Composite Bridge Deck Panels"; by Kevin K. McGhee, Furman W. Barton, and Wallace T. McKeel; 1991 (6 pages).

Magazine article entitled "Plastic Highway Bridges" from ASCE; by Joseph Plecnik, Oscar Henriques, and Rahoul Deshpande; Jul. 1991 (2 pages).

Magazine article entitled "First Plastic Bridge" from Mechanical Engineering; by Steven Ashley; May 16, 1995 (1 page).

Thesis entitled "Analytical and Experimental Evaluation of Fiber Reinforced Plastic Bridge Decks Under Fatigue Loads"; by Waleed Abib Azar; Department of Civil Engineering at California State University, Long Beach; Dec. 1989 (146 pages).

Thesis entitled "Evaluation of Fiber Reinforced Plastic Bridge Decks Under Fatigue Loads Using Acoustic Emission Technique"; by Bassem A. Kabbara; Department of Civil Engineering at California State University, Long Beach; Jun. 1990 (127 pages).

Dissertation entitled "Woven Hybrid Fiber-Reinforced/Multiphase-Matrix Composites for Low Thermal Expansion Applications"; by Daniel H. Richards; Department of Mechanical Engineering at North Carolina State University; Nov. 1995 (195 pages).

Magazine article entitled "Bridges Constructed Using Fiber Reinforced Plastics"; Concrete International; by Magdi A. Khalifa, Sharon S. B. Kuska, and James Krieger; Jun. 1993 (5 pages).

* cited by examiner

COMPOSITE DECKING SYSTEM

This application is a continuation of U.S. patent application Ser. No. 10/269,491 filed Oct. 11, 2002 now U.S. Pat. No. 6,912,821, which is incorporated herein by reference.

BACKGROUND OF THE INVENTION

The present invention is directed to a structural assembly, formed primarily from composite matrix materials having reinforcing fibers in a polymer matrix, which may be used as a decking system or for other applications.

The need for alternative materials and configurations for load bearing decks has long been recognized. Conventional load bearing decks, such as for vehicular bridges, have historically been made from steel and concrete. While the construction techniques, and materials employed, have evolved over time for steel and/or concrete bridges, the construction process has proved to be very labor intensive, and the resulting structures have proven susceptible to corrosion and other degradations.

Partially in response to these cost and degradation issues, it has been proposed to use decking systems based on polymer composite matrix materials rather than steel and/or concrete. For instance, U.S. Pat. No. 5,794,402, incorporated herein by reference, proposes using a modular structural section formed from a polymer composite matrix to form sandwich-type load bearing deck panels for bridges. The '402 patent proposes using a plurality of polymer composite matrix core members sandwiched between upper and lower facesheets to form modular sandwich panels. The core members are described as hollow tubes, typically with a trapezoid cross-section. While the patent indicates that the tube may be made using a pultrusion process, the actual fabrication of such tubes using pultrusion has proven difficult, primarily because pultrusion of hollow tubes, with a fully enclosed passage, is technologically difficult. In simple terms, pultrusion of such hollow shapes requires the use of floating dies, which are difficult to control during manufacture. In addition, the patent teaches that layers of reinforcing fibers with so-called 45°-45°-90° orientation should be used; however, use of such 45°-45°-90° orientation layers is very expensive. Thus, while the modular and polymer composite matrix approach of the U.S. Pat. No. 5,974,402 patent has some theoretical advantages over traditional steel and/or concrete approaches, it has proved difficult to manufacture.

Accordingly, there remains a need for alternate composite structural assemblies that are easier and/or less costly to make and use. Ideally, such an assembly should be capable of being used for applications other than a load bearing deck, but this is not strictly required.

SUMMARY OF THE INVENTION

A composite structural assembly of the present invention includes a baseplate having a plurality of laterally extending open channels and a top plate secured to the baseplate. The baseplate is formed from a first composite matrix comprising reinforcing fibers and a polymer resin, and includes a generally planar base section having first and second sides, a plurality of ribs extending from the first side of the base section, and the plurality of open channels disposed between the ribs and generally bounded by the adjacent ribs and the first side of the base section. In some embodiments, the ribs have a generally T-shaped cross-section and may have laterally extending cap sections disposed distal from and generally parallel to the first side of the base section. The top plate is formed from a second composite matrix of reinforcing fibers and a polymer resin, and is secured to the baseplate so as to generally enclose the channels. Preferably, the top plate is removably secured to the baseplate. Further, in some embodiments, at least one of the base section and the top plate are translucent.

The first composite matrix of the baseplate may include a plurality of first strands of reinforcing fibers, with the first strands oriented in a first direction generally parallel to the channels. The second composite matrix of the top plate may include a plurality of second strands of reinforcing fibers, with the second strands oriented generally perpendicular to the first strands. Either, or both, the first and second composite matrixes may optionally include a plurality of layers of matted reinforcing fibers having a random orientation. In preferred embodiments, substantially all the reinforcing fibers in the first composite matrix are either the strands oriented in the first direction or the matted reinforcing fibers having a random orientation.

The open channel configuration of the baseplate of the present invention allows for easy access within the channels of the base section, and therefore the sides of the ribs, thereby simplifying manufacture. In addition, the use of singly oriented strands of reinforcing fibers (optionally with the matted layers of random orientation) allows for much lower cost materials to be used.

DESCRIPTION OF THE PREFERRED EMBODIMENTS

Figure 1:
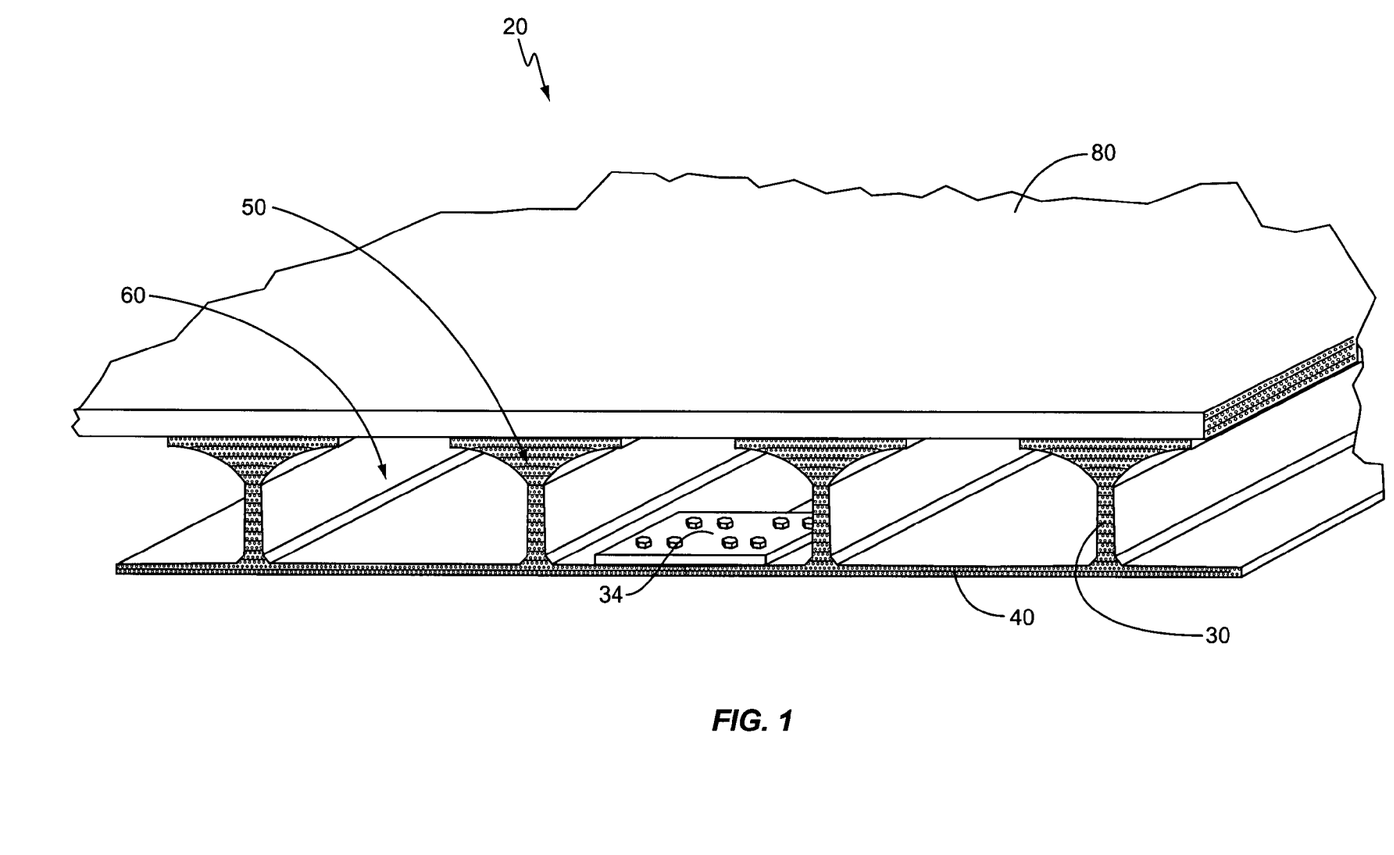
FIG. 1 shows a perspective view of one embodiment of the composite structural assembly of the present invention.

One embodiment of a composite structural assembly of the present invention is shown in FIG. 1, and generally indicated at 20. The assembly 20 includes a baseplate 30 and a top plate 80 secured to the baseplate 30. As shown in more detail in FIGS. 2-3, the baseplate 30 includes a base section 40, a plurality of ribs 50, and a plurality of channels 60. The base section 40 may be a generally flat, preferably rectangular, member with a top side 42 and a bottom side 44. The ribs 50 extend up from the top side 42 of the base section 40 and may advantageously be of a generally T-shaped configuration with a column section 52 and a cap section 54. The column section 52 extends generally perpendicularly away from the base section 40 and may have a generally rectangular cross-section, or tapered as desired. The joint between the column section 52 and the top side 42 of the base section 40 may be configured to reduce stresses and/or to simplify manufacturing, such as by being appropriately radiused. The cap section 54 is formed on the end of the rib 50 opposite the joint with the base section 40 such that the cap section 54 is spaced from the base section 40. The cap section 54 may advantageously take the form of a generally flat element disposed generally perpendicular to the column section 52 of the rib 50 and generally parallel to the base section 40 of the baseplate 30. Again, the joint between the column section 52 and the cap section 54 may be preferably configured to reduce stresses and/or to simplify manufacturing, such as by being appropriately radiused as shown. The cap sections 54 may include a plurality of holes 56 on their top sides for accepting fasteners (see FIG. 4), as discussed further below. The ribs 50 are preferably spaced from one another a uniform distance, with the end ribs 50 being spaced a half-spacing from the respective ends of the baseplate 30.

Figure 2:
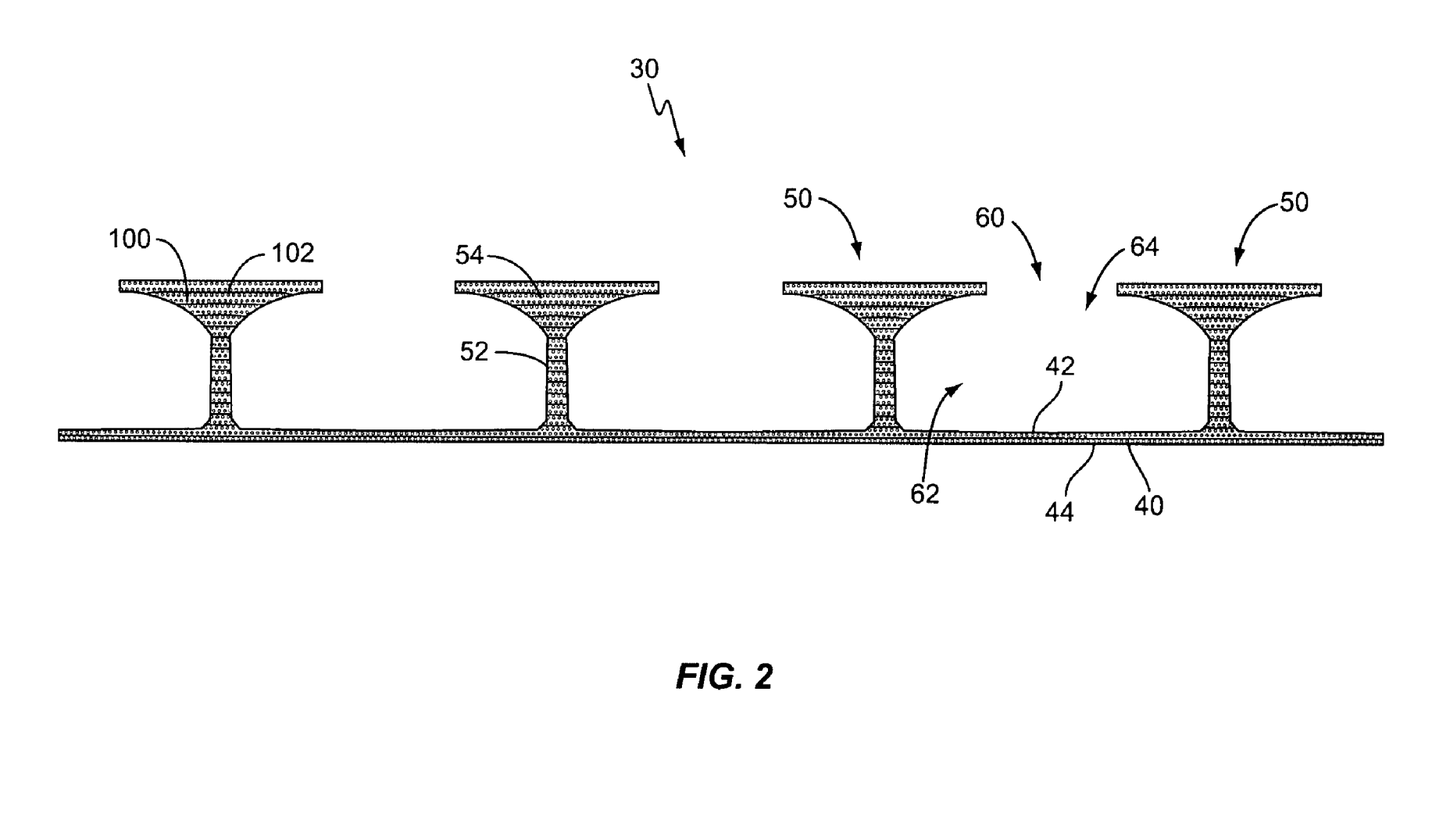
FIG. 2 shows a side view of a baseplate shown in FIG. 1.
Figure 3:
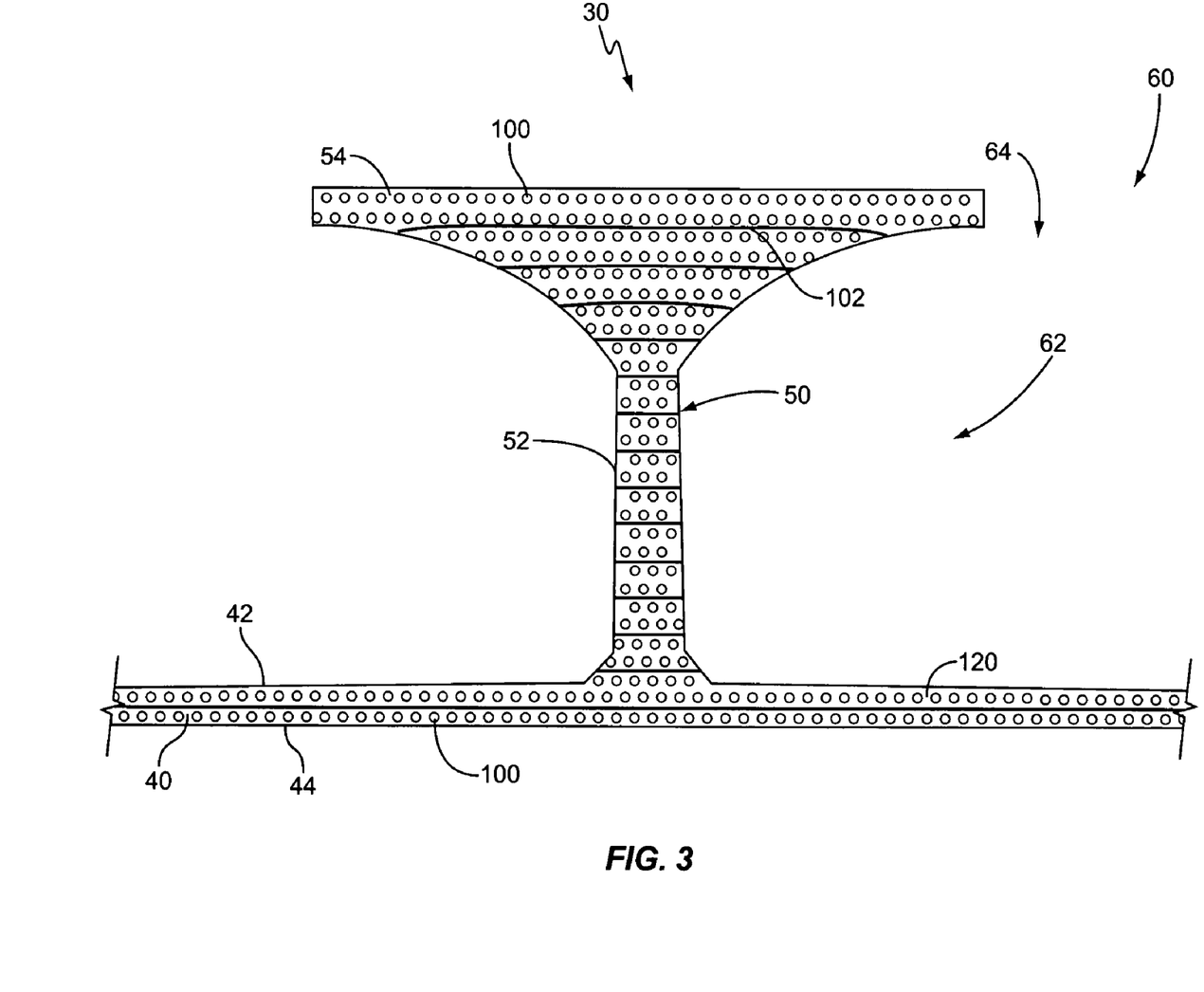
FIG. 3 shows a more detailed view of a portion of the baseplate shown in FIG. 2.

Between each pair of adjacent ribs 50 is a laterally extending open space referred to herein as a channel 60. When viewed endwise, these channels 60 may be conceptually divided into two sections, a cavity 62 and a gap section 64. The cavity 62 is disposed closest to the base section 40, and is generally defined by the walls of the adjacent ribs 50 and the intervening portion of the top side 42 of the base section 40. The gap sections 64 are the areas between the distal end portions of the ribs 50 and connect their respective cavities 62 to the area above the ribs 50. Like the ribs 50, the channels 60 advantageously run laterally from one edge of the baseplate 30 to the opposite edge.

The top plate 80 may take the form of a generally flat rectangular member of relatively thin thickness when compared with the height of the baseplate 30. The top plate 80 may advantageously include a plurality of counter-sunk screw holes 82 aligned in rows to correspond with the distal ends (e.g., cap sections 54) of the ribs 50 of the baseplate 30. The top plates 80 may have peripheral edges that are generally perpendicular to their main faces; however, one or more of the peripheral edges of the top plates 80 may alternatively be angled to create an overlapping joint when top plates 80 are abutted.

When the top plate 80 is secured to the baseplate 30, the top plate 80 bridges the gap sections 64, thereby enclosing the channels 60 in the baseplate 30. Thus, the combination of the baseplate 30 and the top plate 80 may form a modular panel section with what may be referred to as a "sandwich" construction, with the top plate 80 and the base section 40 forming generally parallel surfaces, and the ribs 50 extending therebetween.

The main body of the baseplate 30 and the top plate 80 are formed from a composite matrix that includes reinforcing fibers in a polymer resin. For information about the reinforcing fibers and polymer resin matrix, attention is directed to U.S. Pat. No. 5,794,402. In the baseplate 30, the composite matrix is formed from a plurality of strands 100 of reinforcing fibers that are disposed so as to be generally parallel with the channels 60. Thus, in FIGS. 2-3, only the ends of the strands 100 are shown. The resin 120 forming the matrix surrounds the strands 100. In addition, in order to simplify the manufacturing process, there may be a layer of reinforcing fiber "mat" 102 between each layer of strands 100, or between each second layer of strands 100, or each third layer of strands 100, etc. The mat 102 consists of reinforcing fibers of the same or a different type that are randomly oriented rather than oriented in one, or only a few select, directions.

Likewise, the polymer composite matrix of the top plate 80 is formed from a plurality of reinforcing fiber strands-1 10 in a resin matrix, with optional layers of "mat" 112.

The baseplate 30 and the top plate 80 may be formed by a process known in the art as pultrusion. In somewhat over-simplified terms, the pultrusion process involves the pulling of a plurality of strands (e.g., strands 100 or strands 110) through a shaping die where resin is added. The resulting product has a cross-sectional shape corresponding to the die. For the present invention, the baseplate 30 may be formed by pultrusion in the direction of the channels 60, so that the strands 100 are aligned in the direction of pultrusion.

The strands 100 in the baseplates 30 may be evenly distributed therein. However, it may be advantageous to have a non-uniform distribution of strands 100 within the baseplate 30. For instance, it may be advantageous to have the density of strands 100 vary as a function of distance from the neutral axis of the baseplate 30, as the strands 100 nearest the neutral axis do not add significantly to the bending strength of the baseplate 30, but do add cost. Thus, the column section 52 of the rib 50 may have a lower density of strands 100 than the base section 40 and the cap section 54.

The top plate 80 may also be formed by pultrusion. For the top plate, the direction of the strands 110 should also be in the direction of pultrusion. Note however, that strands 100 and strands 110 will ultimately be disposed in perpendicular orientations with respect to each other in most embodiments of the present invention, as described further below.

While pultrusion has been proposed before for bridge decking components, for instance in U.S. Pat. No. 5,794,402, the cross-sectional shapes employed have proved to be difficult to make. This is due to the fully enclosed nature of the proposed cross-sectional shapes. For instance, the "tubes 46" of FIG. 3 in the '402 patent have central passages that are fully enclosed by the surrounding walls. Such fully enclosed cross-sections are difficult to manufacture, particularly using a pultrusion method. In sharp contrast, the open channel configuration of the baseplate 30 of the present invention allows for easy access to the top side 42 of the base section 40, thereby simplifying manufacture.

Figure 4:
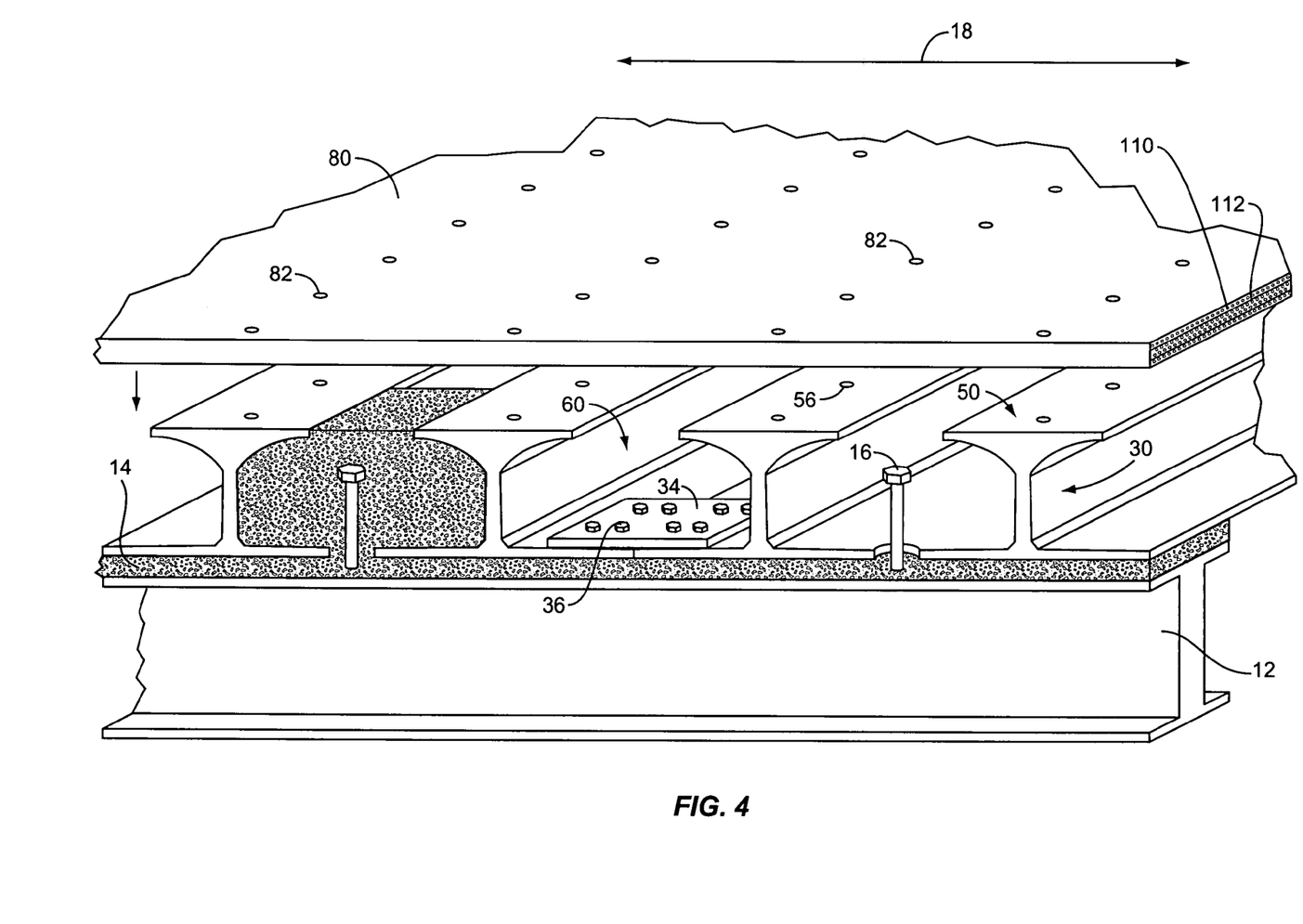
FIG. 4 shows a partially exploded side view of the composite decking system of FIG. 1 employed in a bridge application.

By way of illustrative example, the assembly 20 of the present invention may be employed as part of a vehicular traffic bridge. Various structural supports of a bridge, such as pillars and beams 12, are installed using any conventional approach. Referring to FIG. 4, the relevant beams 12 in this example are oriented in the traffic flow (or longitudinal) direction 18. The assembly 20 described above may then be installed over the beams 12, with each baseplate 30 and top plate 80 preferably on the order of four feet by fifty feet, or more preferably eight feet by fifty feet. Before installing the structural assembly 20, the top of the relevant beams 12 are preferably prepared with L-shaped clips (not shown) added to the edges of the beams 12 and optionally caulked on their upper surfaces. The space between the L-shaped clips and the top of the beam is eventually filled with grout 14, with the weight of the decking system bearing on the beams through the grout 14 when the grout 14 has set. This approach to preparing the beams 12 is commonly referred to in the industry as "variable haunch," and is well understood by those of ordinary skill in the art.

Thereafter, the baseplate(s) 30 are affixed to the beams 12 by any known method. For instance, each baseplate 30 may have suitable holes drilled or otherwise formed therein at suitable intervals for so-called Nelson studs 16 to be installed into the beams 12. If used, the top of each Nelson stud 16 should extend up through the hole and into the corresponding cavity 62 of the baseplate 30. Grout 14 is then pumped in to fill the cavity 62 around the Nelson stud 16. Preferably, some non-load bearing dividers are added inside the channels 60 on either side of each Nelson stud 16 so that the grout 16 surrounding the Nelson stud 16 forms a small grout pocket, and does not fill the entire channel 60. In addition, the grout 14 flows downward around the Nelson stud 16 and into the space between the baseplate 30 and the beam 12. It should be noted that induced vibration of the structure may advantageously be used to aid in the flow of the grout 14 so that the grout completely fills the space between the baseplate 30 and the beam 12. The adjoining baseplate 30 is then likewise installed, and so forth. The adjoining baseplates 30 are joined together, such as by using connecting plates 34 secured in place by suitable fasteners 36 seated in corresponding tapped holes in the edges of the baseplates 30. While not shown, the connecting plates 34 may, if desired, rest in corresponding recesses formed along the edges of the baseplates 30. At this point, the baseplates 30 are joined together and secured to the beams 12. The top plates 80 are then secured to the baseplates 30, with the reinforcing strands 110 of the top plates 80 oriented in the direction 18 of traffic flow and perpendicular to the strands 100 in the baseplates 30. The top plates 80 may be glued to the cap sections 54 of the ribs 50, but are preferably removably secured thereto by suitably spaced bolts. It may be advantageous to seal and/or install expansion joints between adjacent top plates 80 using any known technique. Finally, an additional layer of wear surface may then be applied over the top plates 80, if desired. Note that it may also be advantageous to apply some or all of the additional wear surface to the top plates 80 during manufacture, prior to transporting the same to the installation site.

For the installation approach discussed above, it has been assumed that there is a one-to-one correlation between the number and size (area) of baseplates 30 and top plates 80, with the two components aligned with one another to form a sandwich panel. Within such a panel, the long dimension of the baseplate 30 (e.g., fifty feet) is in the same direction as the long dimension of the top plate 80 (e.g., fifty feet), but strands 100 and strands 110 are oriented perpendicular to one another. However, the present invention should also be construed to cover arrangements where a given top plate 80 is secured to a plurality of baseplates 30, thereby enclosing channels 60 from more than one baseplate 30. In addition, some embodiments of the present invention may have the long dimension of the baseplates 30 running in one direction (e.g., transverse to traffic flow 18) and the long dimension of the top plates 80 running in a perpendicular direction (e.g., parallel to traffic flow 18). Whatever the orientations of the baseplate 30 and the top plate 80, strands 100 and strands 110 should be oriented generally perpendicular to one another once installed.

In addition to bridge installations, the present invention is particularly suited to parking deck applications. The installation in parking decks may be carried out substantially as described above. In addition, the channels 60 may be used to house cables, conduits, utilities, heating elements, drains, and the like, particularly those channels 60 not used for Nelson studs 12. Indeed, if the matrix of the baseplate 30 and/or the top plate 80 is translucent, then lighting elements may be installed in the unused channels 60. Further, for the embodiments where the top plate 80 is removably secured to the baseplate(s) 30, the relevant top plate 80 may be removed to provide access to the lighting, cabling, etc. for repair or replacement, and thereafter re-secured in place.

Of course, the structural assembly 20 of the present invention is not limited to bridge or parking deck applications, and may also be used for any applications where a load bearing panel is required or desired (e.g., in offshore oil platforms, floating platforms, etc.). Further, the structural assembly 20 may also be used in non-horizontal applications, such as vertical walls for buildings, noise walls, flood walls, and the like, where the structural assembly 20 is not substantially loaded.

By way of non-limiting example, a useful composite deck assembly 20 may be made with a baseplate 30 four feet wide by fifty feet long having a base section 40 of ½ inch thickness, three ribs 50 of seven inch height and spaced at one foot intervals, approximately ½ inch wide rib columns 52, and four inch wide cap sections 54. The base section 40 of the baseplate 30 may be made in an alternating layered fashion with four layers of strands 100 of sixty-four yield (a measure of length per unit weight of the reinforcing strand) E-glass at a density of eight strands 100 per inch, and five layers of E-glass mat 102, both in an isophthalic polyester resin 120. The column section 52 of the ribs 50 of the baseplate 30 may likewise be made in alternating layered fashion with three layers of strands 100 of sixty-four yield E-glass at a density of four strands per inch, and four layers of E-glass mat 102, in the isophthalic polyester resin 120. It should be noted that as understood by one of ordinary skill in the art, the layers of the column section 52 may be "stacked" in a different direction than the layers in the baseplate 30; for instance, the layers in the baseplate may be stacked "north-south" and the layers in the column section 52 may be stacked "east-west." The cap sections 54 may be an alternating layered construction having four layers of strands 100 of sixty-four yield E-glass at a density of eight strands per inch, and five layers of E-glass mat 102, in the isophthalic polyester resin 120. The top plate 80 may likewise be four feet by fifty feet by ½ inch thick and made in an alternating layered fashion with four layers of strands 110 of sixty-four yield E-glass at a density of six strands per inch, and five layers of E-glass mat 112, both in an isophthalic polyester resin 120. The top plate 80 may be secured to the baseplate by 72 inch diameter bolts at two inch spacings. Both the baseplate 30 and the top plate 80 may be made using a pultrusion process. Such an arrangement should be suitable for supporting a HS-25 loading as defined by the American Association of State Highway and Transportation Officials (AASHTO).

The description of the structural assembly 20 given above has assumed that the baseplate 30 is disposed beneath the top plate 80; however, the relative positions of the two components may be switched without departing from the scope of the present invention. For example, while it may be less advantageous, the top plate 80 may be disposed below the baseplate 30, with the ribs 50 extending downwardly. As such, the terms "baseplate" and "top plate" are not intended to be interpreted as implying relative locations, and are not intended to exclude such inverted arrangements.

The generic term "strands" have been used to describe the grouping of reinforcing fibers (filaments) indicated at 100, 110. It should be noted that this generic term is intended to encompass what are alternatively known in the industry as "ends," "tows," "rovings," and the like. Such strands may be made from glass fibers (e.g., S-glass, E-glass), aramid fibers, carbon fibers, graphite, and the like.

While the invention has been illustrated and described in detail in the drawings and foregoing description, the same is to be considered as illustrative and not restrictive in character, it being understood that only some embodiments have been shown and described and that all changes and modifications that come within the meaning and equivalency range of the appended claims are intended to be embraced therein.

What is claimed is:

1. A method of forming a composite structural assembly, comprising:
   providing a baseplate formed from a first composite matrix comprising reinforcing fibers in a polymer resin via a pultrusion process, said baseplate comprising:
      a generally planar base section having a first side corresponding to a first of upper and lower faces thereof and a second side corresponding to another of said upper and lower faces;

a plurality of ribs extending from said first side of said base section; and a plurality of open channels disposed between said ribs and generally bounded by adjacent said ribs and said first side of said base section;

providing a top plate formed from a second composite matrix of reinforcing fibers in a polymer resin;

thereafter, securing said top plate to said baseplate so as to generally enclose at least a portion of said channels;

forming a hole in said base section between a selected pair of said ribs, wherein said hole communicates with a corresponding channel defined by said selected pair of said ribs, wherein said hole is adapted to receive a fastener to fasten said baseplate to a support beam;

inserting a fastener into said corresponding channel and through said hole to secure said baseplate to the support beam; and introducing grout into said corresponding channel such that said grout surrounds at least a portion of said fastener to secure said fastener in said corresponding channel;

wherein said corresponding channel is enclosed when said top plate is secured to said baseplate.

2. The method of claim 1 wherein said ribs comprise laterally extending cap sections disposed distal from and generally parallel to said first side of said base section.

3. The method of claim 1 wherein said ribs have a generally T-shaped cross-section.

4. The method of claim 1 wherein said first composite matrix includes a plurality of first strands of reinforcing fibers, and said first strands are oriented in a first direction generally parallel to said channels during said pultrusion.

5. The assembly of claim 4 wherein said second composite matrix includes a plurality of second strands of reinforcing fibers, said second strands are oriented in a second direction, and wherein said securing said top plate to said baseplate comprises securing said top plate to said baseplate such that said second direction is generally perpendicular to said first direction of said first strands.

6. The method of claim 1 wherein said base section of said baseplate is formed with a translucent matrix.

7. The method of claim 1 wherein said top plate is formed with a translucent matrix.

8. The method of claim 1 wherein securing said top plate to said baseplate comprises removably securing said top plate to said adjacent ribs of said baseplate.

9. The method of claim 1 wherein securing said top plate to said baseplate comprises engaging a plurality of fasteners directly with said ribs of said baseplate to secure said top plate to said ribs of said baseplate.

10. The method of claim 1 further comprising generating light from within at least one of said channels, said light being visible through said base section.

11. The method of claim 1 wherein said baseplate is a first baseplate, wherein said channels are first channels, and further comprising providing a second baseplate formed substantially similar to said first baseplate and having second channels, and further comprising said securing said top plate to said first and second baseplates so as to generally enclose at least a portion of said first and second channels.

12. The method of claim 1 wherein said baseplate comprises a unitary baseplate with said open channels laterally defined by said ribs of the same baseplate.

13. The method of claim 1 wherein:

said baseplate comprises a unitarily pultruded member with said plurality of ribs being of approximately the same height relative to said first side of said base section and said open channels are generally laterally defined and bounded by adjacent said ribs and said first side of said base section; and securing said top plate to said baseplate includes securing said top plate to said ribs distal from said base section so as to generally enclose each said open channel for at least a portion thereof to define a circumferentially enclosed passageway laterally bounded by adjacent ones of said ribs.

14. The method of claim 1 including mounting a vehicular wear surface layer on top of said top plate on a side of said top plate opposite said baseplate.

15. The method of claim 1 wherein the step of inserting said fastener into said corresponding channel and through said hole precedes the step of securing said top plate to said baseplate.

16. A method, comprising:

providing a unitary, pultruded baseplate having a generally planar base section, a plurality of ribs, and a plurality of open channels, said baseplate comprising a first composite matrix comprising reinforcing fibers in a polymer resin; wherein said plurality of ribs extend from said first side of said base section to a generally uniform height; wherein said plurality of open channels are generally laterally defined by adjacent ones of said ribs of the same baseplate;

providing a generally planar top plate formed from a second composite matrix of reinforcing fibers in a polymer resin;

securing said top plate to said ribs distal from said base section to convert at least one of said open channels to a circumferentially enclosed passageway laterally bounded by adjacent ones of said ribs;

forming a hole in said base section between a selected pair of said ribs, wherein said hole communicates with a corresponding channel defined by said selected pair of said ribs, wherein said hole is adapted to receive a fastener to fasten said baseplate to a support beam;

inserting a fastener into said corresponding channel and through said hole to secure said baseplate to the support beam; and introducing grout into said corresponding channel such that said grout surrounds at least a portion of said fastener to secure said fastener in said corresponding channel;

wherein said corresponding channel is enclosed by said top plate to define a corresponding circumferentially enclosed passageway when said top plate is secured to said ribs distal from said base section.

17. The method of claim 16 wherein said ribs comprise laterally extending cap sections disposed distal from and generally parallel to said first side of said base section; and wherein said top plate and said baseplate are configured such that securing said top plate to said ribs results in said top plate extending from one of said ribs to an adjacent one of said ribs so as to bridge a gap between the corresponding cap sections.

18. The method of claim 16 wherein the step of inserting said fastener into said corresponding channel and through said hole precedes the step of securing said top plate to said ribs distal from said base section.

19. The method of claim 16 including mounting a vehicular wear surface layer on top of said top plate on a side of said top plate opposite said baseplate.

20. A method of forming a composite structural assembly, comprising:

providing a unitary baseplate formed from a first composite matrix comprising reinforcing fibers in a polymer resin, said baseplate comprising:
  a generally planar base section having a first side corresponding to a first of upper and lower faces thereof and a second side corresponding to another of said of upper and lower faces;
  a plurality of ribs extending from said first side of said base section and generally running in a longitudinal direction; wherein said plurality of ribs are of approximately the same height relative to said first side of said base section, said ribs each having a respective end distal from the base section; and
  a plurality of open channels disposed between said ribs and generally bounded by adjacent said ribs and said first side of said base section of the same unitary baseplate; and
providing a top plate, distinct from said baseplate, formed from a second composite matrix of reinforcing fibers in a polymer resin;
thereafter, securing said top plate to said ends of said ribs so as to generally enclose at least a longitudinal portion of said channels;
forming a hole in said base section between a selected pair of said ribs, wherein said hole communicates with a corresponding channel defined by said selected pair of said ribs, wherein said hole is adapted to receive a fastener to fasten said baseplate to a support beam;
inserting a fastener into said corresponding channel and through said hole to secure said baseplate to the support beam; and
introducing grout into said corresponding channel such that said grout surrounds at least a portion of said fastener to secure said fastener in said corresponding channel;
wherein said corresponding channel is enclosed when said top plate is secured to said ends of said ribs.

21. The method of claim 20 wherein the step of inserting said fastener into said corresponding channel and through said hole precedes the step of securing said top plate to said ends of said ribs.

22. The method of claim 20 including mounting a vehicular wear surface layer on top of said top plate on a side of said top plate opposite said baseplate.

* * * * *